March 7, 1967 G. A. UNDERWOOD 3,307,220
MOLD HANDLING APPARATUS
Filed April 30, 1964 7 Sheets-Sheet 1
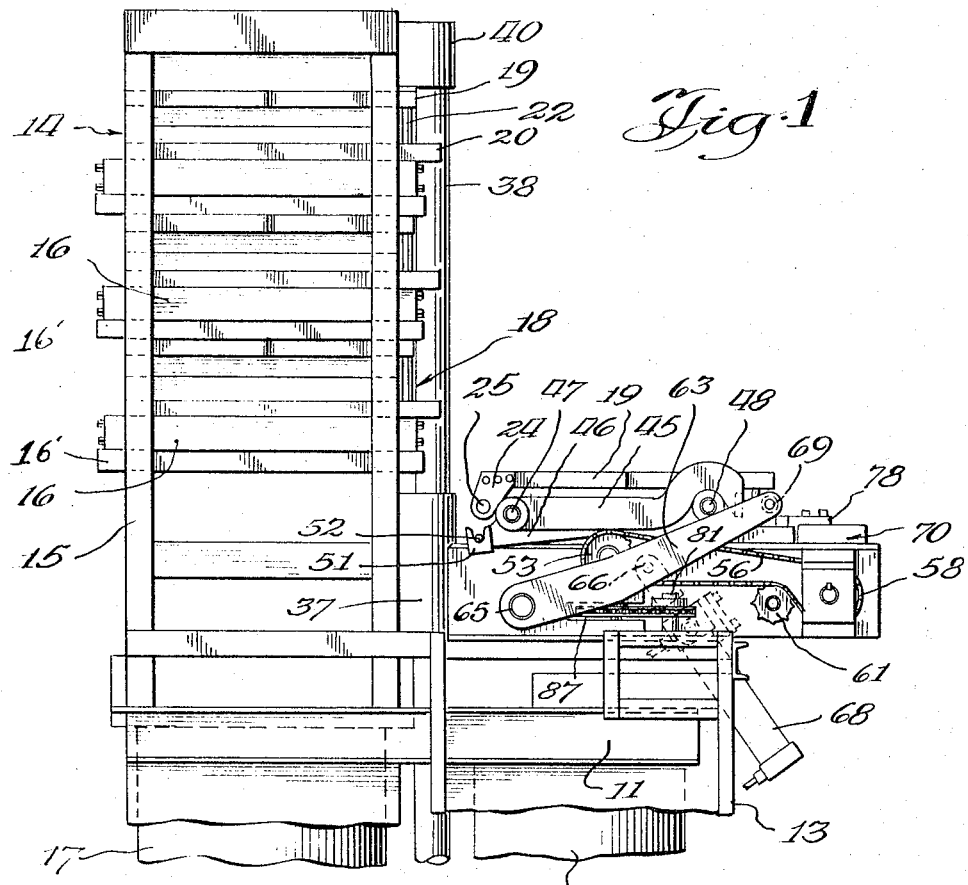
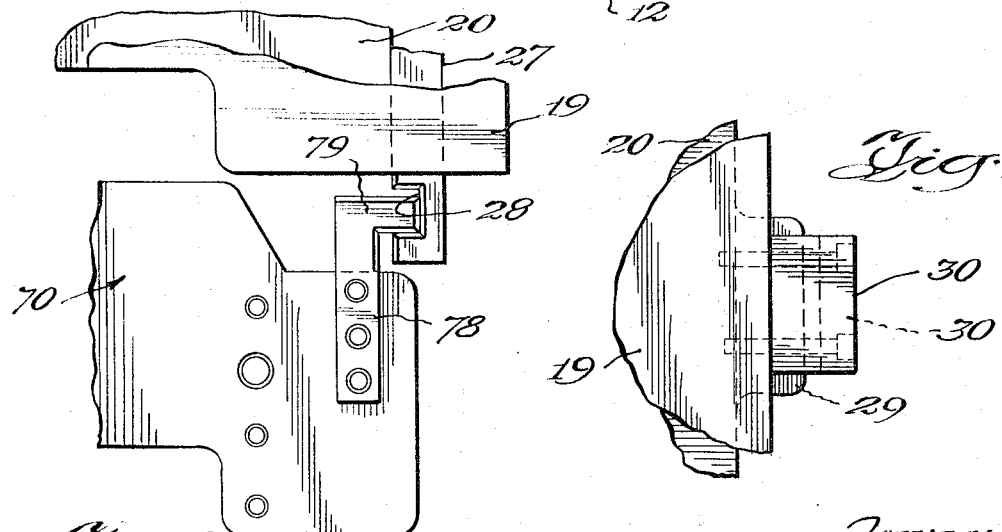
Inventor
George A. Underwood
By Dressler, Goldsmith, Clement, Gordon & Todd
Attorneys March 7, 1967 G. A. UNDERWOOD 3,307,220
MOLD HANDLING APPARATUS
Filed April 30, 1964 7 Sheets-Sheet 2

Inventor
George A. Underwood
By Dressler, Goldsmith, Clement, Gordon & Todd
Attorneys

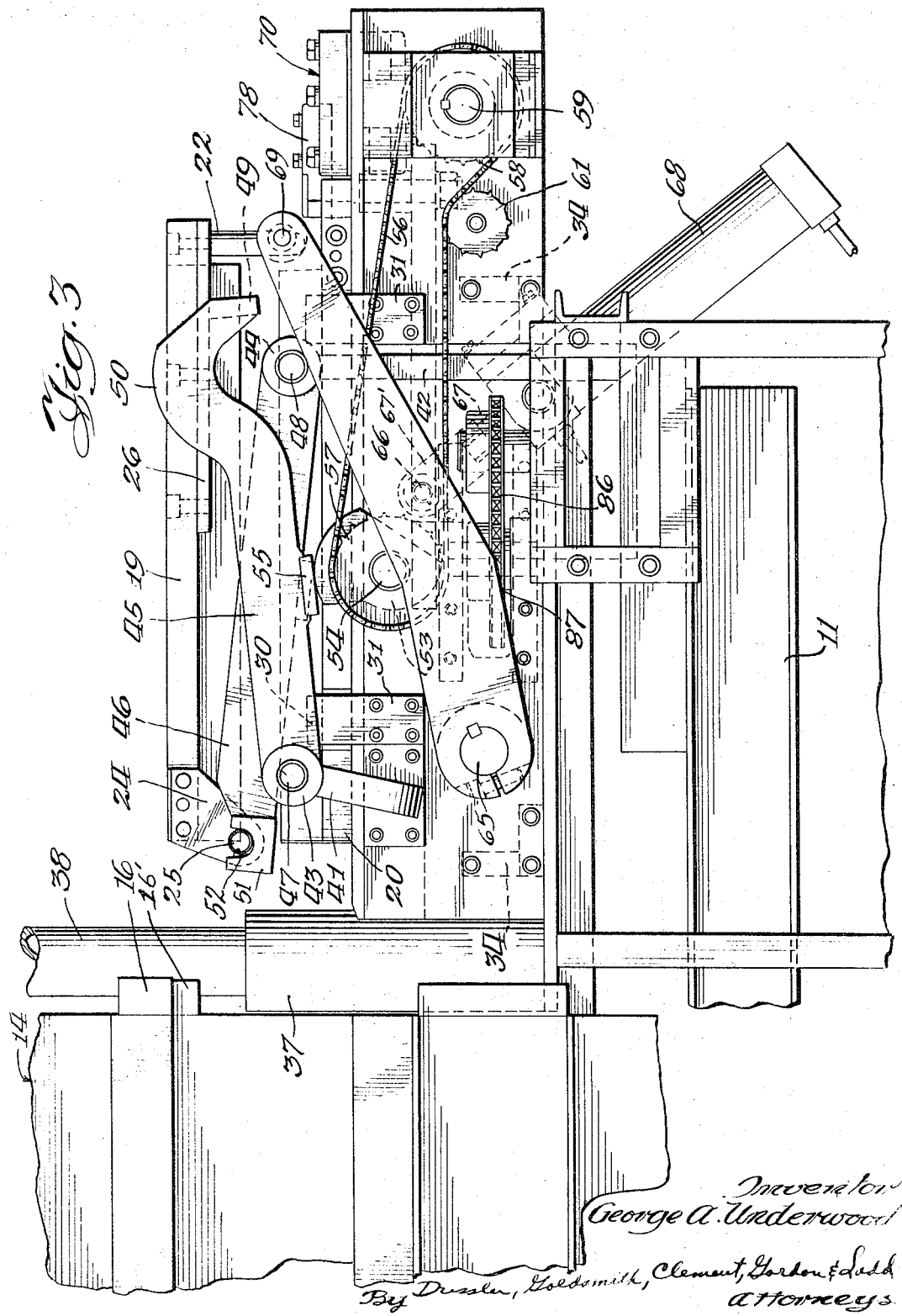

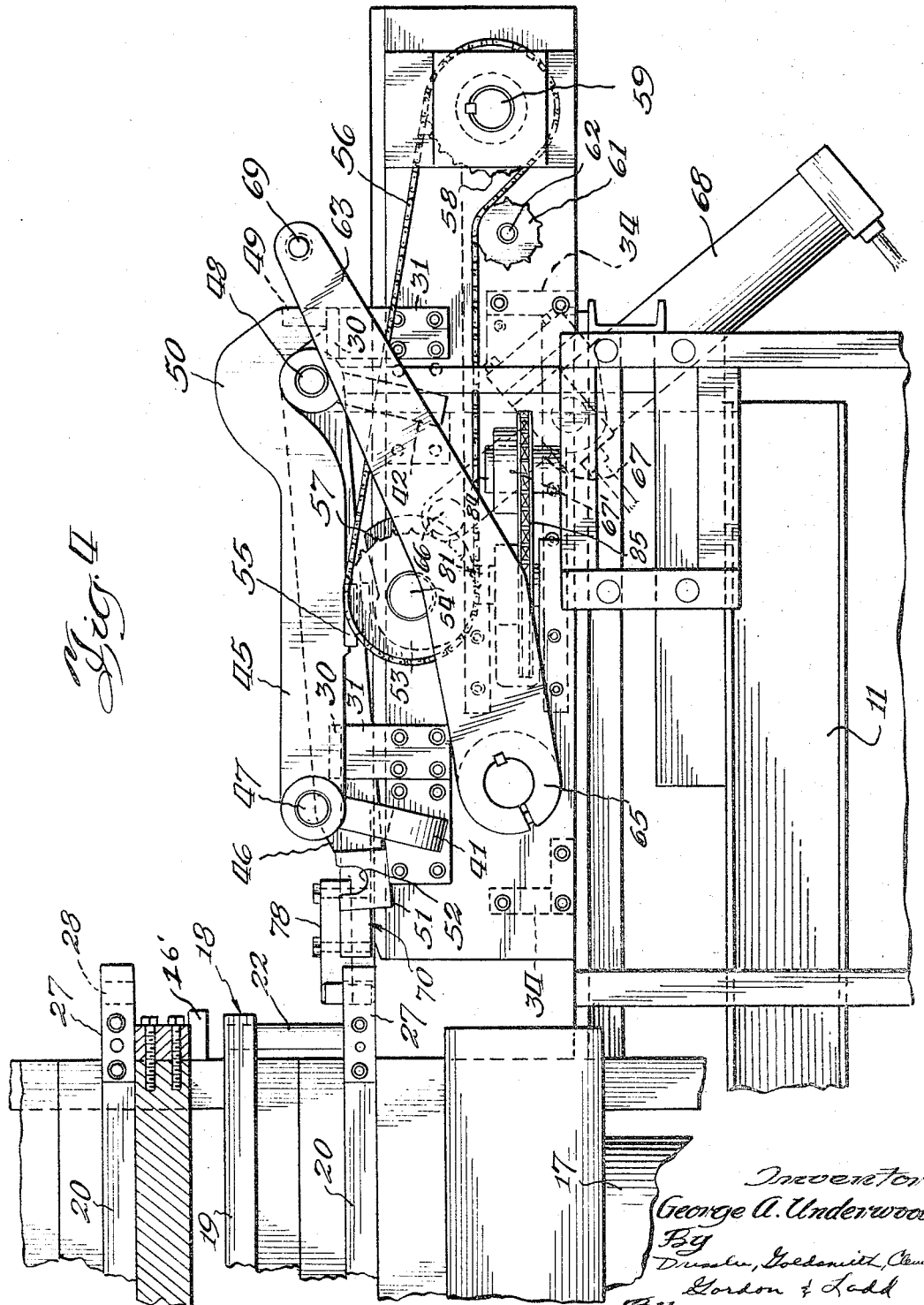

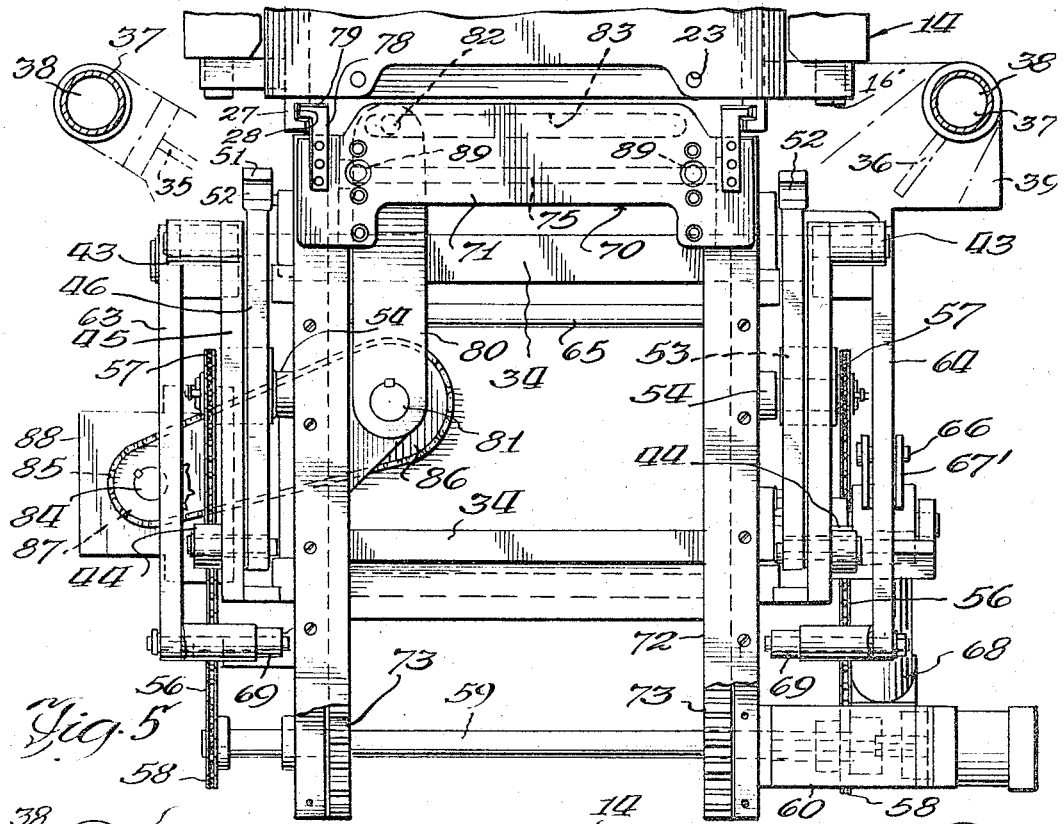

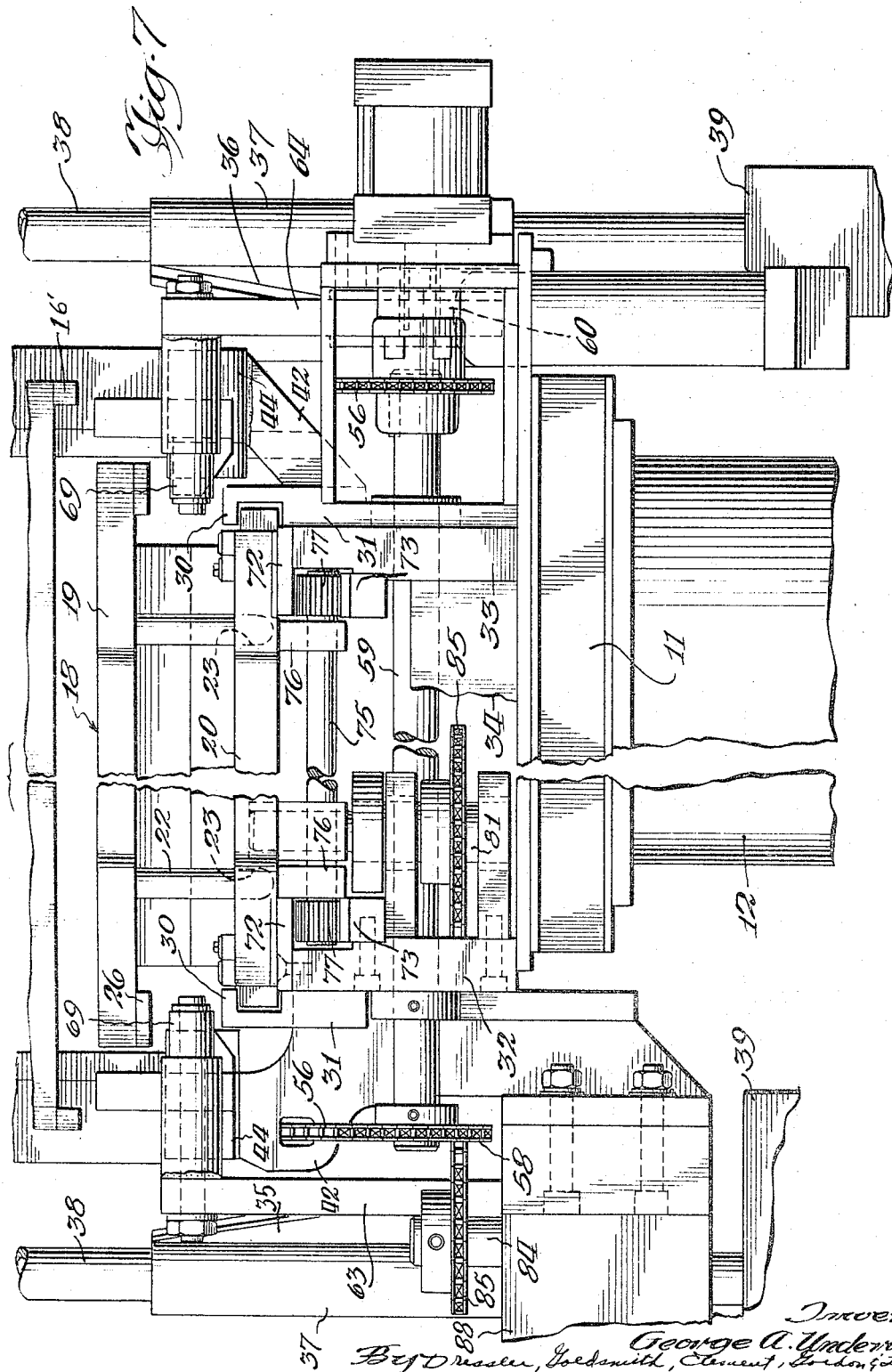

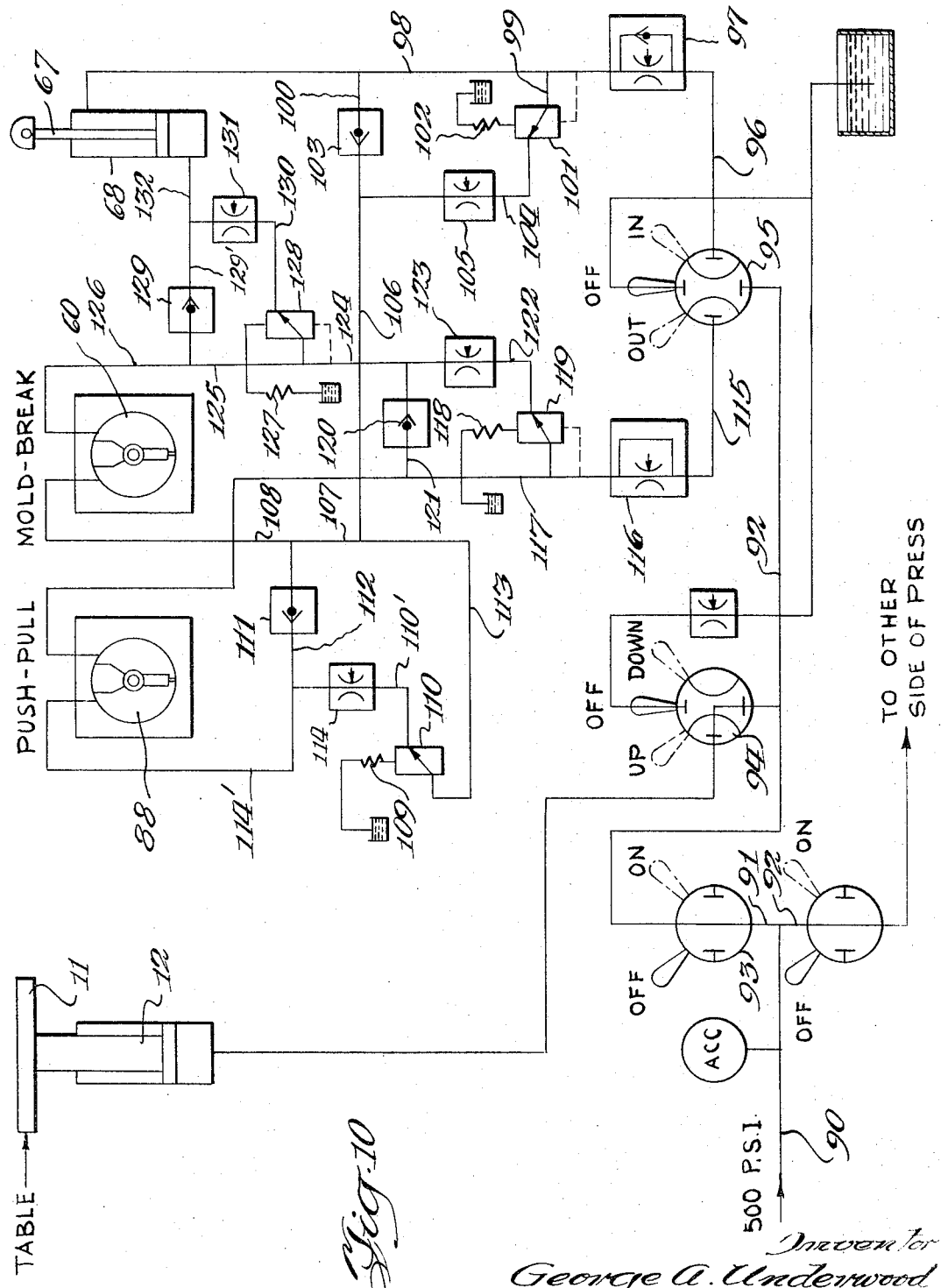

United States Patent Office 3,307,220
Patented Mar. 7, 1967

3,307,220
MOLD HANDLING APPARATUS
George A. Underwood, Skokie, Ill., assignor to Felt Products Mfg. Co., a corporation of Illinois
Filed Apr. 30, 1964, Ser. No. 363,741
21 Claims. (Cl. 18—16)

This invention relates to mold handling apparatus, and is particularly concerned with means for facilitating the handling of molds to utilize the press time with maximum efficiency.

The mold handling apparatus of the present invention is designed for use with a conventional press having a plurality of vertically spaced platens defining compartments into which the molds may be inserted. The platens are movable vertically upwardly by a ram operated by any suitable means. The ram applies pressure to the molds stacked in the press and releases the pressure to allow each platen to move downwardly to a predetermined position by gravity. Each platen is stopped in its lowermost position by a suitable stop member, and the vertical spacing between said platens permits withdrawal of said molds from the press.

The apparatus comprising the present invention is adapted to be used in connection with a press having compartments for two molds that are inserted and removed from the same side of the press. When the apparatus is used with such press, one mold is unloaded and then reloaded with material to be molded, while the other mold is being heated under pressure.

Although the drawings show a press with each mold removable from only the front of the press, it will be understood that the press may be open on the front and back, with mold handling apparatus on each of said sides, so that molds may be inserted and removed from the front or back of the press. The molding cycle may be arranged so that in a press having compartments for four molds, the steps of loading the mold, inserting it into the press, pulling it out of the press after the material is cured, and removing the molded products are duplicated on opposite sides of the press.

With a press having the mold handling apparatus of the present invention on one side only or on opposite sides of the press, one or more of the molds is loaded with material to be molded while one or more other molds, previously loaded, are being heated under pressure to cure the material positioned in the mold or molds in the press. In this way the press is operated continuously, and the press time lost while the molds are being loaded with material to be molded or while the molded products are being removed from the mold is kept at a minimum. Each mold is loaded and unloaded outside of the press so that the operator has easy access to the mold when it is being loaded or unloaded and is not subjected to excessive heat.

The structure by means of which the above mentioned and other advantages of the invention are attained will be described in the following specification, taken in conjunction with the accompanying drawings, showing a preferred illustrative embodiment of the invention, in which:

FIGURE 1 is a fragmentary side elevational view of a press, with the mold handling apparatus of the present invention mounted adjacent the front of the press, with the mold held by the apparatus in the position occupied immediately after it has been removed from the press or just before it is pushed into the press;

FIG. 3 is a view, similar to FIG. 2, showing the mold at the start of the mold opening step;

FIG. 4 is an enlarged side elevational view of the mold handling apparatus in the position occupied just after the mold has been pushed into the press;

FIG. 5 is a plan view of the mold handing apparatus with the mold positioned in the press;

FIG. 6 is a plan view, similar to FIG. 5, with the mold withdrawn from the press;

FIG. 7 is a fragmentary front elevational view of the mold handling apparatus;

FIG. 8 is an enlarged fragmentary plan view, showing the means for securing the mold handling apparatus to the mold for moving the mold into or out of the press;

FIG. 9 is an enlarged fragmentary plan view of the means for holding the lower master plate of the mold down when the top master plate is raised to open the mold; and FIG. 10 is a diagrammatic view of the hydraulic systems for operating the mold handling apparatus.

Figure 2:
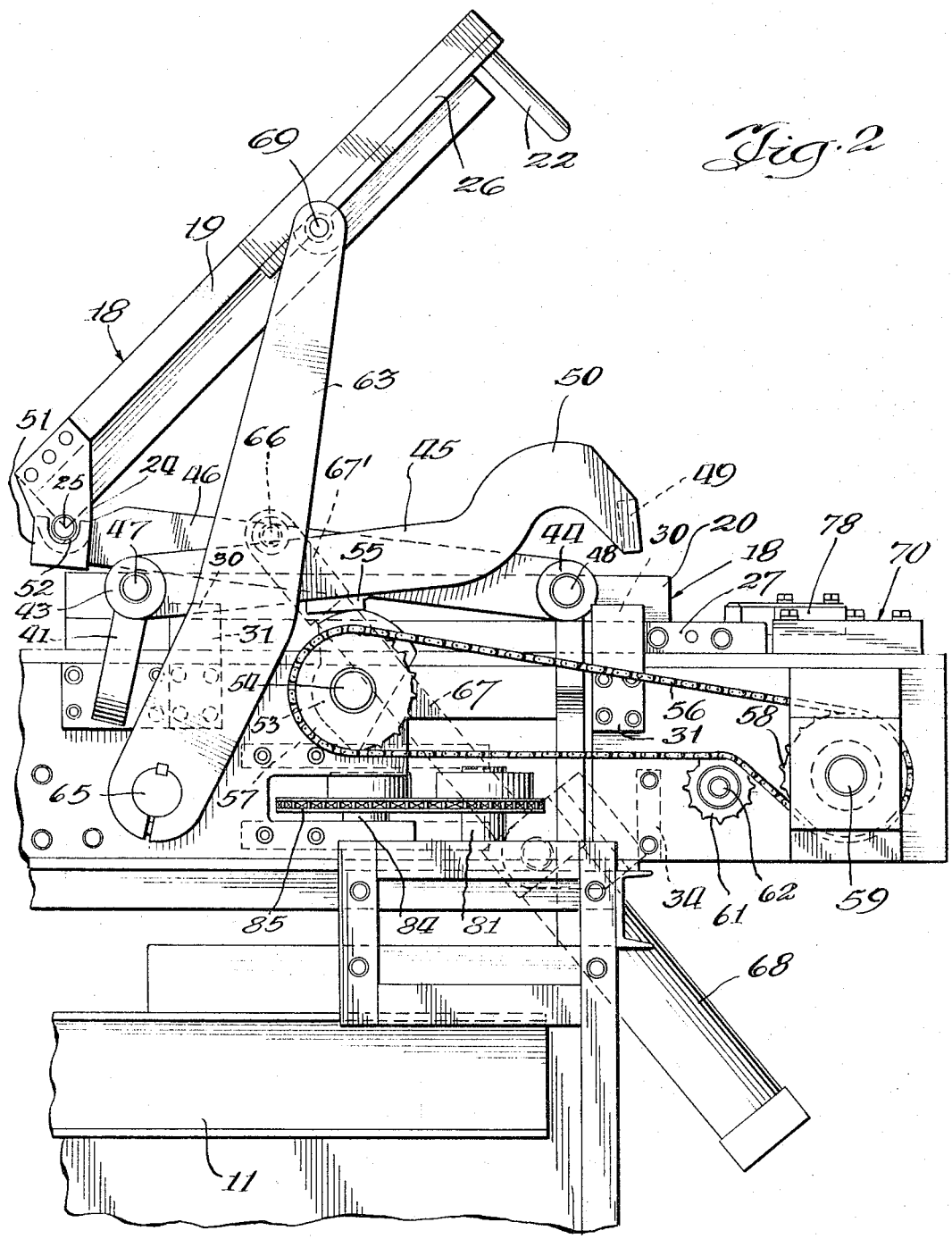
FIG. 2 is an enlarged fragmentary side elevational view of the mold handling apparatus with a mold in fully open position.

In the drawings, the mold handling apparatus is mounted on a platform 11 carried on the upper end of a piston 12 supported by a frame 13 of any suitable construction. Piston 12 is preferably operated hydraulically, but may be operated in any suitable manner. Frame 13 is adjacent a conventional press 14 which includes a frame 15, a plurality of vertically movable platens 16 and a ram 17 adapted to move platens 16 upwardly and apply pressure to each of the molds positioned in the compartments between adjacent platens. When ram 17 is moved downwardly, each of the platens moves downwardly by gravity. A plurality of stop members 16' projects outwardly of frame 14 at each of several vertical levels to limit the downward movement of each platen and to support said platens at vertically spaced intervals within the frame of the press. The stop members project outwardly of the frame far enough to support the platens, but not far enough to interfere with the vertical movement of the platform 11.

A mold 18, of the type the mold handling apparatus is designed to handle, is mounted to a top master plate 19 and a lower master plate 20. Complementary dies having mold cavities 21 are secured to the master plates in any suitable manner. Usually a single die is secured to each master plate, but a plurality of smaller dies may be secured to each master plate, if desired. Two guide pins 22 extending from the top master plate adjacent its front edge are adapted to fit in apertures 23 provided therefor in the front edge portion of the lower master plate to insure accurate vertical alignment of the top and lower master plates. A bracket 24 depending from each side of the top master plate adjacent its rear edge carries a stud 25 that projects outwardly from the bracket. Each longitudinal edge of the top master plate has a steel strip 26 secured on its underside for a purpose hereinafter described. Each strip 26 extends from the front end of the top master plate for about half the length of the master plate.

The lower master plate has a bar 27 secured to each side and extending forwardly of its front edge. The forwardly extending portion of each bar 27 has a notch 28 on its inner edge for a purpose hereinafter described. The lower master plate also has lugs 29 projecting laterally outwardly from each side thereof. Lugs 29 are so located that when the mold is in the position in which it is opened, the lugs each engage an overlying lip 30, formed by notching the upper end of a bar 31. Bars 31 are secured to each of the side walls 32 and 33 of the mold handling apparatus near the front and rear ends of each side wall. The interengagement of lugs 29 and lips 30 holds the lower master plate against upward movement when the top master plate is lifted upwardly to open the mold.

Side walls 32 and 33 are secured to platform 11, and transverse support members 34 are secured to said side walls, as shown in FIG. 7. Brackets 35 and 36, secured to side walls 32 and 33, respectively, each support a tubular sleeve 37 that is slidably mounted on a post 38. The lower end of each post 38 is secured in a block 39 and the upper end is secured to a bracket 40 secured to the upper end of press 14 and projecting laterally therefrom. The interengagement of sleeves 37 and posts 38 prevents platform 11 from moving in any direction except vertically.

A bracket 41 is secured to each side wall 32 and 33 adjacent its rear end, and a bracket 42 is similarly secured to each side wall 32 and 33 adjacent its front end. Brackets 41 support a pair of axially aligned horizontal bearing sleeves 43, and brackets 42 support a similar pair of sleeves 44. An arm 45 is pivotally mounted in each bearing sleeve 43 on opposite sides of the mold, and an arm 46 is pivotally mounted in each bearing sleeve 44. Each arm 45 has a laterally projecting stud 47 pivotally mounted in one sleeve 43, and each arm 46 has a laterally projecting stud 48 pivotally mounted in one sleeve 44. The arms of each pair are pivotally movable in closely spaced vertical planes. Each arm 46 underlies one edge portion of top master plate 19, and each arm 45 has a lug 49 projecting laterally from its free end and underlying the steel strip 26 on the underside of top master plate 19 adjacent each side thereof. The free end of each arm 45 is curved, as shown at 50, to provide clearance for bearing sleeve 44. A block 51, integral with the rear end of each arm 46, is recessed on its top surface to provide an open top bearing 52 for a purpose hereinafter described.

Arms 45 and 46 of each pair of arms are simultaneously raised about their various pivots 47 and 48, respectively, by means of a cam 53 at each side of the apparatus. The cams are mounted on axially aligned shafts 54, and each cam underlies one arm 45 and one arm 46. Each arm 45 and 46 has a plate 55 secured to its underside to engage the cam. Each cam is rotated by a chain 56 extending around a sprocket 57 on shaft 54 and a sprocket 58 on a drive shaft 59. Shaft 59, upon which both sprockets 58 are mounted, is driven by a rotary hydraulic cylinder 60. Chain 56 is kept taut by a sprocket 61 rotatably mounted on the idler shaft 62.

After the mold is opened, the top master plate is lifted into fully open position by arms 63 and 64 at opposite sides of the apparatus. Arms 63 and 64 are keyed to opposite ends of a shaft 65 journaled in side walls 32 and 33 and operate simultaneously. Arm 63 is pivotally secured, intermediate its ends, as indicated at 66, to a clevis 67' secured to the outer end of a piston rod 67 slidably mounted in a hydraulic cylinder 68. Arms 63 and 64 each have a stud 69 extending inwardly to underlie steel strips 26 on the underside of top master plate 19 at opposite sides thereof. As arms 63 and 64 raise the front end of top master plate 19, the studs 25 at the rear end of the top master plate, seated in open top bearing 52, serve as a pivot for the movement of top master plate 19 to its fully open position.

The mold is moved forwardly and rearwardly in a horizontal plane above platform 11 by a crosshead 70. The crosshead comprises a flat plate 71 slidably mounted on two laterally spaced rails 72. Each rail is mounted on the top of a side wall 32 or 33. The rails are wider than the side walls and project inwardly thereof. A rack 73 is secured to the inner surface of each side wall with teeth 74 on its upper surface in spaced relationship to the underside of the rail. A shaft 75 journaled in lugs 76 depending from plate 71 has a pinion 77 mounted on each end thereof. The teeth of the pinions are meshed with the teeth of the racks so that both sides of the crosshead are kept even as the crosshead is moved in either direction. The crosshead is also provided with roller bearings 89 to keep it centered. Rails 72 prevent vertical displacement of either pinion. An L-shaped bar 78 secured to the upper surface of plate 71 adjacent each side projects rearwardly of said plate and has a hook 79 engageable with notch 28 to enable the crosshead to pull the mold out of the press or to push it into the press.

The crosshead is moved forwardly and rearwardly along rails 72 by an arm 80 keyed to a vertical shaft 81 and having a stud 82 engaging a recess 83 in the underside of plate 71. A slot may be substituted for recess 83. The recess or slot is closed at each end to prevent displacement of stud 82 therefrom. Shaft 81 is rotated by a vertical shaft 84 through a chain 85 extending around sprockets 86 and 87 which are secured to shafts 81 and 84, respectively. Shaft 84 is driven by a rotary hydraulic cylinder 88, the rotational movement of which is limited to 270° in each direction. The ratio between sprockets 86 and 87 reduces the rotational movement of shaft 81, and therefore of arm 80, to 180°. As arm 80 swings through its arc of 180°, stud 82 slides in recess 83 and pushes or pulls the cross-head toward and away from the press.

Referring now to FIG. 10, the sequence of operations. starting with an empty mold in fully open position, will be described. This is the position of the apparatus shown in FIG. 2 of the drawings. A conduit 90 carrying water or other hydraulic fluid under pressure of approximately 500 pounds per square inch is divided into two branch conduits 91 and 92. Branch 92 is a duplicate of branch 91 and therefore is not shown or described in detail. An on-off valve 93 regulates the flow of water or other hydraulic fluid through conduit 91. A second valve 94 interposed in conduit 91 regulates the flow of water or other fluid to raise or lower platform 11. A third valve 95 controls the mold handling apparatus.

When valve 95 is turned to the right, as viewed in FIG. 10, the water flows through a conduit 96 and a flow control valve 97 into a conduit 98. Although two conduits 99 and 100 communicate with conduit 98, the water cannot flow into either of them. Conduit 99 leads directly to a first sequencing valve 101, and the water does not have sufficient pressure to overcome a spring 102 that holds valve 101 closed. Conduit 100 has a check valve 103 that will not allow the water to flow through said conduit. The water flowing through conduit 98 flows into hydraulic cylinder 68 and retracts piston rod 67.

The outer end of the piston rod is pivotally connected to the center of arm 63 and pulls it downwardly about pivot 65. Retraction of piston rod 67 also pulls arm 64 downwardly, since both arms 63 and 64 are keyed to shaft 65. This downward pivotal movement of arms 63 and 64 allows the front end of top master plate 19 to move pivotally downwardly by gravity. Studs 25, which are seated in open top bearings 52 at this stage of the operation, serve as pivots for the top master plate. Guide pins 22 depending from the front edge of the top master plate fit into apertures 23 in the lower master plate to insure proper vertical alignment of the top master plate. When piston rod 67 has been retracted to the full extent of its movement, and top master plate is in vertical registration with the lower master plate and is spaced a short distance above it. The rear end of the top master plate is supported by studs 25 seated in bearings 52, and the front end is supported by lugs 49. The continued flow of water in conduit 98 builds up the water pressure in the upper portion of cylinder 68 and in conduit 98 until it exceeds the pressure of spring 102. The water then flows from conduit 98 through said first sequencing valve 101.

Valve 101 controls rotary hydraulic cylinder 60 by directing the water through a conduit 104 having a flow control valve 105 therein, and through conduits 106, 107 and 108 into rotary hydraulic cylinder 60. Cylinder 60 operates a cam 53 on each side of the apparatus through shaft 59 and chains 56. Chains 56 are each engaged with a sprocket 58 and a second sprocket 57. Each sprocket 57 is secured to a shaft 54 to which one of the cams is keyed. Rotation of the cams permits arms 45 and 46 to move downwardly about their pivots 47 and 48, respectively, thereby allowing the top master plate to move downwardly into its closed position in which its lower surface engages the upper surface of the lower master plate. In this position, bearings 52 are spaced below studs 25 so that the mold can be moved in its horizontal plane.

If the mold is not in horizontal alignment with the compartment of the press into which it is to be moved for the curing operation, the required alignment is obtained by moving platform 11, on which the mold handling apparatus is mounted, vertically relative to the press. If desired, platform 11 may be held stationary, and the platens in the press may be coved vertically. The mechanism for moving the platform, or for moving the ram and platens of the press, is independent of the mold handling apparatus, and is not part of the present invention. When the mold is in horizontal alignment with the press, hooks 79 are engaged in notches 28 so that horizontal movement of crosshead 70 will move the mold into and out of the press.

The continued flow of water in conduits 106, 107 and 108 builds up the pressure in these conduits until it exceeds the pressure of spring 109 which holds a second sequencing valve 110 closed. A check valve 111 keeps the water from flowing into conduit 112, and valve 101 will not permit water to flow through it in the reverse direction. The pressure behind check valve 103 is greater than the pressure of spring 109. Therefore the water flows through conduit 113 and sequencing valve 110. From valve 110 the water flows through a conduit 110', a flow control valve 114, and a conduit 114' to rotate rotary hydraulic cylinder 88 through an angle of 270°, which is the maximum angle through which cylinder 88 can rotate.

Cylinder 88 rotates shaft 84 to which sprocket 87 is keyed. Chain 85 engages sprocket 87 and sprocket 86 to rotate shaft 81, to which sprocket 86 is keyed. The ratio of sprocket 87 to 86 is such that rotation of shaft 84 through 270° rotates shaft 81 through 180°. Arm 80 is fixed to shaft 81 so that it turns through an angle of 180° with said shaft. Stud 82 slides along recess 83 to move crosshead 70 rearwardly and to push the mold into the press. When the mold is in the press, valve 95 is closed, and valve 94 is operated to move piston 12 vertically to disengage hooks 79 from notches 28 so that the crosshead may be attached to another mold. When the press is filled to the desired extent, ram 17 is raised to apply a predetermined pressure to the molds. The pressure is maintained while heat is applied to cure the material in the molds.

After the material in the molds is cured to the desired extent, ram 17 is lowered to release the pressure, and platform 11 is raised, by means of valve 94, to position the mold handling apparatus in horizontal alignment with one of the molds in the press. Valve 94 is closed, and valve 95 is then opened to the left, as viewed in FIG. 10. The water from valve 95 flows through a conduit 115, a flow control valve 116, and conduit 117 into rotary hydraulic cylinder 88 to rotate it through its maximum rotational movement of 270° in the opposite direction from its previous rotational movement. The rotational movement of cylinder 88 moves arm 80 forwardly through an angle of 180° to pull the mold engaged by crosshead 70 out of the press. The continued flow of water builds up the pressure in conduit 117 until it exceeds the pressure of spring 118 which holds a third sequencing valve 119 closed. A check valve 120 keeps the water from passing through conduit 121. The water passes through valve 119 which directs the water through a conduit 122, a flow control valve 123, and conduits 124, 125 and 126 into rotary hydraulic cylinder 60.

The rotational movement of cylinder 60 acts through shaft 59, sprocket 58, chain 56, sprocket 57 and shafts 54 to rotate cams 53 in a direction to lift arms 45 and 46 upwardly about their respective pivots, thereby lifting top master plate 19 to break open the mold. Lugs 29 projecting laterally from lower master plate 20 engage lips 30 to hold the lower master plate down when the mold is opened.

The continued flow of water through flow control valve 123 builds up the water pressure in conduits 124, 125 and 126 until it exceeds the pressure of spring 127 which holds a fourth sequencing valve 128 closed. A check valve 129 keeps the water from flowing through conduit 129'. The water passes through valve 128, conduit 130, flow control valve 131 and conduit 132 into the lower end of hydraulic cylinder 68. The water moves piston rod 67 outwardly to lift arm 63 upwardly about its pivot 65 to move the front edge of top master plate 19 upwardly about pivot 25 into fully open position so that the mold can be unloaded to make it ready for a new cycle of operations.

Although I have described a preferred embodiment of the invention in considerable detail it will be understood that the description thereof is intended to be illustrative, rather than restrictive, as many details of structure may be modified or changed without departing from the spirit or scope of the invention. Accordingly, I do not desire to be restricted to the exact structure disclosed.

I claim:

1. An apparatus for handling a mold comprising a top master plate and a lower master plate, said apparatus comprising means for moving said mold in opposite directions in a horizontal plane into and out of a press, means for moving said top master plate relative to said lower master plate to open said mold, and means for pivotally moving one edge portion of said top master plate about a horizontal axis adjacent the opposite edge thereof to provide access to the interior of said mold whereby said mold may be loaded or unloaded.

2. An apparatus for handling a mold comprising a top master plate and a lower master plate, said apparatus comprising means for moving said mold in opposite directions into and out of a press, means for moving said top master plate vertically relative to said lower master plate to open said mold, and means operable only when said mold is open for pivotally moving one edge portion of said top master plate about a horizontal axis adjacent the opposite edge thereof to provide access to the interior of said mold, whereby said mold may be loaded or unloaded.

3. An apparatus for handling a mold comprising a top master plate and a lower master plate, said apparatus comprising a crosshead, an arm pivotally mounted on a fixed axis, said arm having its free end slidably engaged with said crosshead, means to pivotally move said arm through 180° whereby said crosshead is moved in opposite straight line directions in a horizontal plane, means for detachably securing said crosshead to said mold whereby said mold may be moved into and out of a press, means for moving said top master plate relative to said lower master plate to open said mold, and means for pivotally moving one edge portion of said top master plate about a horizontal axis adjacent the opposite edge thereof to provide access to the interior of said mold, whereby said mold may be loaded or unloaded.

4. An apparatus for handling a mold comprising a top master plate and a lower master plate, said apparatus comprising a crosshead, means for detachably securing said crosshead to said mold, means for moving said crosshead in opposite directions in a horizontal plane whereby said mold may be moved into and out of a press, means for moving said top master plate relative to said lower master plate to open said mold, and means operable only when said mold is open for pivotally moving one edge portion of said top master plate about a horizontal axis adjacent the opposite edge thereof to provide access to the interior of said mold, whereby said mold may be loaded or unloaded.

5. In combination with a press having vertically spaced compartments, a platform adjacent said press, means for moving said platform vertically into horizontal alignment with individual compartments of said press, and an apparatus for handling a mold comprising a top master plate and a lower master plate, said apparatus being mounted on said platform, said apparatus comprising means for moving said mold in opposite directions in a horizontal plane into and out of individual compartments of said press, and means for moving said top master plate relative to said lower master plate to open said mold.

6. In combination with a press, having vertically spaced compartments, a platform adjacent said press, means for moving said platform vertically into horizontal alignment with individual compartments of said press, an apparatus for handling a mold comprising a top master plate and a lower master plate, said apparatus being mounted on said platform, said apparatus comprising means for moving said mold in opposite directions in a horizontal plane whereby said mold may be moved rearwardly into and forwardly out of individual compartments of said press, means for moving said top master plate relative to said lower master plate when said mold is in its foremost position to open said mold, and means operable only when said mold is open for pivotally moving one edge portion of said top master plate about a horizontal axis adjacent the opposite edge thereof to provide access to the interior of said mold, whereby said mold may be loaded or unloaded.

7. An apparatus for handling a mold comprising a top master plate and a lower master plate, said apparatus comprising means for moving said mold into and out of a press, a pair of arms positioned adjacent each longitudinal edge of said apparatus, one arm of each of said pairs of arms being pivoted with its free end engageable with the underside of said top master plate near the front thereof when said mold is out of said press, said other arm of each of said pairs of arms being pivoted with its free end engageable with the underside of said top master plate near the rear thereof, and means for pivotally moving each of said arms upwardly simultaneously to move said top master plate vertically relative to said lower master plate to open said mold.

8. An apparatus for handling a mold comprising a top master plate and a lower master plate, said apparatus comprising means for moving said mold into and out of a press, a pair of arms positioned adjacent each longitudinal edge of said apparatus, one arm of each of said pairs of arms being pivoted with its free end engageable with the underside of said top master plate near the front thereof when said mold is out of said press, said other arm of each of said pairs of arms being pivoted with its free end engageable with the underside of said top master plate near the rear thereof, a cam for pivotally moving each pair of arms upwardly, and means to operate said cams in unison to move said top master plate vertically in parallel relationship to the plane of said lower master plate to open said mold.

9. An apparatus for handling a mold comprising a top master plate and a lower master plate, said apparatus comprising means for moving said mold into and out of a press, a pair of arms positioned adjacent each longitudinal edge of said apparatus, one arm of each of said pairs of arms being pivoted with its free end engageable with the underside of said top master plate near the front thereof when said mold is out of said press, said other arm of each of said pairs of arms being pivoted with its free end engageable with the underside of said top master plate near the rear thereof, means for pivotally moving each of said arms upwardly simultaneously to move said top master plate vertically relative to said lower master plate to open said mold, and means operable only when said mold is open for pivotally moving one edge portion of said top master plate about a horizontal axis adjacent the opposite edge thereof to provide access to the interior of said mold, whereby said mold may be loaded or unloaded.

10. An apparatus for handling a mold comprising a top master plate and a lower master plate, said apparatus comprising means for moving said mold into and out of a press, a pair of arms positioned adjacent each longitudinal edge of said apparatus, one arm of each of said pairs of arms being pivoted with its free end engageable with the underside of said top master plate near the front thereof when said mold is out of said press, said other arm of each of said pairs of arms being pivoted with its free end engageable with the underside of said top master plate near the rear thereof, means for pivotally moving each of said arms upwardly simultaneously and downwardly simultaneously to move said top master plate vertically relative to said lower master plate to open and close said mold, means for pivotally moving one edge portion of said top master plate about a horizontal axis adjacent the opposite edge thereof to provide access to the interior of said mold, whereby said mold may be loaded or unloaded, and a hydraulic system for automatically operating each of said means in predetermined sequence.

11. An apparatus for handling a mold comprising a top master plate and a lower master plate, said apparatus including means for pivotally moving one edge of the top master plate of a fully open mold downwardly into vertical alignment and parallel relationship to said lower master plate, means for moving said top master plate downwardly in said parallel relationship to close said mold, means for moving said closed mold into a press, and a hydraulic system for automatically operating each of said means in sequence in the order named.

12. An apparatus for handling a mold comprising a top master plate and a lower master plate, said apparatus including a pivoted arm for holding one edge of the top master plate in fully open position, a hydraulic cylinder and a piston rod for pivotally moving said arm downwardly to permit said top master plate to move into vertical alignment and parallel relationship to said lower master plate, means for moving said top master plate downwardly in said parallel relationship to close said mold, means for moving said closed mold into a press, and a hydraulic system for automatically operating said hydraulic cylinder and each of said means in sequence in the order named.

13. An apparatus for handling a mold comprising a top master plate and a lower master plate, said apparatus including means for pivotally moving one edge of the top master plate of a fully open mold downwardly into vertical alignment and parallel relationship to said lower master plate, a pair of arms adjacent each side of said mold, the arms of each of said pairs of arms being pivoted adjacent opposite ends, hydraulic means for holding each of said arms in its uppermost position to support said top master plate in said parallel relationship and to move all of said arms downwardly simultaneously to allow said top master plate to move downwardly in said parallel relationship to close said mold, means for moving said closed mold into a press, and a hydraulic system for automatically operating each of said means in sequence in the order named.

14. An apparatus for handling a mold comprising a top master plate and a lower master plate, said apparatus including means for pivotally moving one edge of the top master plate of a fully open mold downwardly into vertical alignment and parallel relationship to said lower master plate, means for moving said top master plate downwardly in said parallel relationship to close said mold, a crosshead, a hook detachably securing said crosshead to said lower master plate, an arm pivoted to swing in a horizontal plane, the outer end of said arm being slidably engaged with a recess extending transversely of said crosshead, means moving said arm pivotally to move said closed mold in a horizontal plane along a straight line path into a press, and a hydraulic system for automatically operating each of said means in sequence in the order named.

15. An apparatus for handling a mold comprising a top master plate and a lower master plate, said apparatus including means for moving a closed mold out of a press, means for moving said top master plate vertically relative to said lower master plate to open said mold, means for pivotally moving one edge portion of said top master plate upwardly about a horizontal axis adjacent the opposite edge thereof to provide access to the interior of said mold, whereby said mold may be unloaded, and a hydraulic system for automatically operating each of said means in sequence in the order named.

16. An apparatus for handling a mold comprising a top master plate and a lower master plate, said apparatus including means for moving a closed mold out of a press, a pair of arms adjacent each side of said mold, the arms of each of said pairs of arms being pivoted adjacent opposite ends, hydraulic means for pivotally moving all of said arms upwardly simultaneously to move said top master plate vertically relative to said lower master plate to open said mold, means for pivotally moving one edge portion of said top master plate upwardly about a horizontal axis adjacent the opposite edge thereof to provide access to the interior of said mold, whereby said mold may be unloaded, and a hydraulic system for automatically operating each of said means in sequence in the order named.

17. An apparatus for handling a mold comprising a top master plate and a lower master plate, said apparatus including a crosshead, a hook detachably securing said crosshead to said lower master plate, an arm pivoted to swing in a horizontal plane, the outer end of said arm being slidably engaged with a recess extending transversely of said crosshead, means for pivotally moving said arm to pull a closed mold out of a press, means for moving said top master plate vertically relative to said lower master plate to open said mold, means for pivotally moving one edge portion of said top master plate upwardly about a horizontal axis at the opposite edge thereof to provide access to the interior of said mold, whereby said mold may be unloaded, and a hydraulic system for automatically operating each of said means in sequence in the order named.

18. An apparatus for handling a mold comprising a top master plate and a lower master plate, said apparatus including means for moving a closed mold out of a press, means for moving said top master plate vertically relative to said lower master plate to open said mold, a pivoted arm having one end engaging one side of said top master plate, a hydraulic cylinder, a piston rod mounted in said cylinder and connected to said pivoted arm for pivotally moving one edge portion of said top master plate upwardly about a horizontal axis adjacent the opposite edge thereof to provide access to the interior of said mold, whereby said mold may be unloaded, and a hydraulic system for automatically operating each of said means and said hydraulic cylinder in sequence in the order named.

19. An apparatus for handling a mold comprising a top master plate and a lower master plate, said apparatus including means for pivotally moving one edge portion of the top master plate of a fully open mold downwardly into vertical alignment and parallel relationship to the lower master plate of said mold, means for moving said top master plate downwardly in said parallel relationship to close said mold, means for moving said closed mold into a press, and a hydraulic system divided into two parts, one of said parts of said hydraulic system being adapted to automatically operate each of said means in sequence in the order named, said other part of said hydraulic system being adapted to automatically operate each of said means in sequence in reverse order to move said closed mold out of said press, to move said top master plate vertically upwardly to open said mold, and to pivotally move said edge portion of said top master plate upwardly into fully open position.

20. An apparatus for handling a mold comprising a top master plate and a lower master plate, said apparatus including a pivoted arm engaging one side of the top master plate of a fully open mold, a hydraulic cylinder and a piston rod engaging said arm to pivotally move said arm downwardly to permit said top master plate to move into vertical alignment and parallel relationship to the lower master plate of said mold, means for moving said top master plate downwardly in said parallel relationship to close said mold, means for moving said closed mold into a press, and a hydraulic system divided into two parts, one of said parts of said hydraulic system being adapted to automatically operate said hydraulic cylinder and each of said means in sequence in the order named, said other part of said hydraulic system being adapted to automatically operate each of said means and said hydraulic cylinder in sequence in reverse order, said hydraulic cylinder, when operated by said second part of said hydraulic system, pivotally moving said arm upwardly to pivotally move one edge portion of said top master plate upwardly about a horizontal axis adjacent the opposite edge of said top master plate to provide access to the interior of said mold whereby said mold may be unloaded.

21. An apparatus for handling a mold comprising a top master plate and a lower master plate, said apparatus including means for pivotally moving one edge of the top master plate of a fully open mold downwardly into vertical alignment and parallel relationship to the lower master plate of said mold, a pair of arms adjacent each side of said mold, the arms of each of said pairs of arms being pivoted adjacent opposite ends, cam means for holding each of said arms in its uppermost position to support said top master plate in said parallel relationship, said cam means being rotatable to allow all of said arms to pivotally move downwardly simultaneously to allow said top master plate to move downwardly in said parallel relationship to close said mold, means for moving said closed mold into a press, and a hydraulic system divided into two parts, one of said parts of said hydraulic system being adapted to automatically operate each of said means in sequence in the order named, said other part of said hydraulic system being adapted to automatically operate each of said means in sequence in reverse order, said cam means, when operated by said second part of said hydraulic system, being rotated to pivotally move said arms upwardly and to move said top master plate vertically upwardly to open said mold.

References Cited by the Examiner

UNITED STATES PATENTS

| | | | |
|---|---|---|---|
| 1,640,949 | 8/1927 | Loomis | 18—16 |
| 1,744,754 | 1/1930 | Denmire | 264—334 |
| 2,431,048 | 11/1947 | Kilborn | 18—16 |
| 2,812,543 | 12/1957 | Stacey | 18—16 |

ROBERT F. WHITE, *Primary Examiner.*

R. B. MOFFITT, *Assistant Examiner.*